United States Patent [19]

Matsushita

[11] Patent Number: 5,781,426
[45] Date of Patent: Jul. 14, 1998

[54] BOOSTER CIRCUIT AND METHOD OF DRIVING THE SAME

[75] Inventor: Yuichi Matsushita, Miyasaki-pref., Japan

[73] Assignee: Oki Electric Industry Company, Ltd., Tokyo, Japan

[21] Appl. No.: 829,175

[22] Filed: Mar. 31, 1997

[30] Foreign Application Priority Data

May 28, 1996 [JP] Japan .................. 8-133122

[51] Int. Cl.$^6$ .................................................. H02M 7/00
[52] U.S. Cl. .................................................. 363/60
[58] Field of Search ....................... 363/59, 60; 327/535, 327/536, 537

[56] References Cited

U.S. PATENT DOCUMENTS

| | | | |
|---|---|---|---|
| 4,110,639 | 8/1978 | Redwine | 307/279 |
| 5,055,840 | 10/1991 | Barlett | 341/31 |
| 5,357,468 | 10/1994 | Satani et al. | 365/189.01 |
| 5,661,419 | 8/1997 | Bhagwan | 327/8 |

*Primary Examiner*—Matthew V. Nguyen
*Attorney, Agent, or Firm*—Wenderoth, Lind & Ponack, L.L.P.

[57] ABSTRACT

A typical booster circuit of the present invention comprises a first capacitor having first and second electrodes, a second capacitor having first and second electrodes, a switching circuit for transferring boosted potential appearing on each first electrode of the first and second capacitors to a boosting potential output node, a precharge circuit for precharging each first electrode of the first and second capacitors, a logic circuit for setting a potential level of the second electrode of the first capacitor to a first potential level and setting a potential level of the second electrode of the second capacitor to a second potential level which is higher than the first potential level, respectively upon reception of a control signal having a first state, and for setting the potential level of the second electrode of the first capacitor to the second potential level, and setting the potential level of the second electrode of the second capacitor to the first potential level, respectively upon reception of a control signal having a second state, a detector circuit for outputting a detecting signal having a first state when a potential level of the boosting potential output node is lower than a given value, and outputting a detecting signal having a second state when the potential level of the boosting potential output node is higher than the given level, and a control signal generator circuit for alternately outputting the control signals having the first and second states in response to an oscillation signal upon reception of the detecting signal having the first state, and for outputting either of the control signal having the first state or the control signal having the second state irrespective of the oscillation signal upon reception of the detecting signal having the second state.

13 Claims, 9 Drawing Sheets

FIG. 9

| Ss | OSC | Sc |
|----|-----|-----|
| 0 | 0 | 1 |
| 0 | 1 | 0 |
| 1 | 0 | 1 |
| 1 | 1 | 1 |

BOOSTER CIRCUIT AND METHOD OF DRIVING THE SAME

BACKGROUND OF THE INVENTION

1. Field of the Invention

The present invention relates to a booster circuit for generating a potential level which is higher than a power-supply potential level and a method of driving the same.

2. Description the Related Art

Potential levels of word lines, e.g., in a dynamic random access memory (DRAM) are required to be boosted higher than a power-supply potential level. To achieve this object, a booster circuit is incorporated in the DRAM. There has been desired an improvement of the booster circuit because there has been a possibility that a sufficient potential level can not be generated immediately when the booster circuit is resumed after a temporary stop of the boosting operation.

SUMMARY OF THE INVENTION

It is an object of the present invention to provide a booster circuit capable of surely performing a boosting operation, and a method of driving the booster circuit.

It is another object of the present invention to provide a booster circuit capable of immediately generating a sufficient boosting level, and a method of driving the booster circuit.

A typical booster circuit of the present invention comprises a first capacitor having first and second electrodes, a second capacitor having first and second electrodes, a switching circuit for transferring boosted potential appearing on each first electrode of the first and second capacitors to a boosting potential output node, a precharge circuit for precharging each first electrode of the first and second capacitors, a logic circuit for setting a potential level of the second electrode of the first capacitor to a first potential level and setting a potential level of the second electrode of the second capacitor to a second potential level which is higher than the first potential level, respectively upon reception of a control signal having a first state, and for setting the potential level of the second electrode of the first capacitor to the second potential level, and setting the potential level of the second electrode of the second capacitor to the first potential level, respectively upon reception of a control signal having a second state, a detector circuit for outputting a detecting signal having a first state when a potential level of the boosting potential output node is lower than a given value, and outputting a detecting signal having a second state when the potential level of the boosting potential output node is higher than the given level, and a control signal generator circuit for alternately outputting the control signals having the first and second states in response to an oscillation signal upon reception of the detecting signal having the first state, and for outputting either of the control signal having the first state or the control signal having the second state irrespective of the oscillation signal upon reception of the detecting signal having the second state.

BRIEF DESCRIPTION OF THE DRAWINGS

FIG. 9 shows a truth table of a control signal generator circuit.

DETAILED DESCRIPTION OF THE PREFERRED EMBODIMENT

A booster circuit and a method of driving the same will be now described more in detail with reference to the attached drawings. Each figure is merely schematically illustrated for the convenience of understanding of the booster circuit. Constituents which are common to each figure are denoted by the common numerals. Overlapping explanation for the common constituents is omitted.

Figure 1:
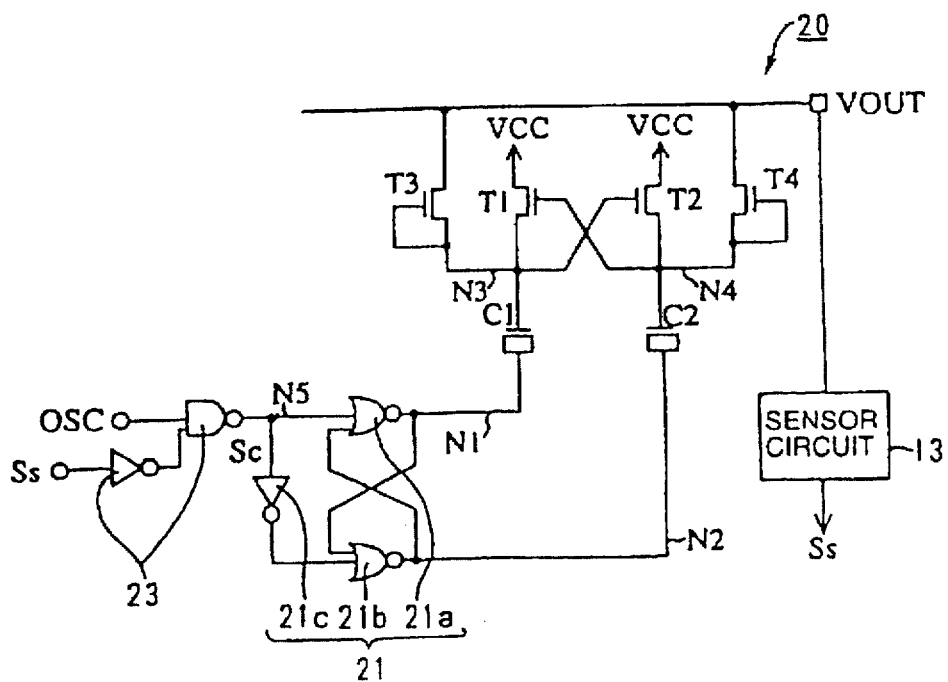
FIG. 1(A) is a view of a booster circuit according to a first embodiment of the invention.
FIG. 1(B) is a view showing a part of the booster circuit in FIG. 1(A)
Figure 1:
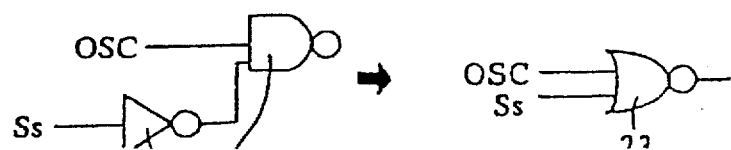
Figure 2:
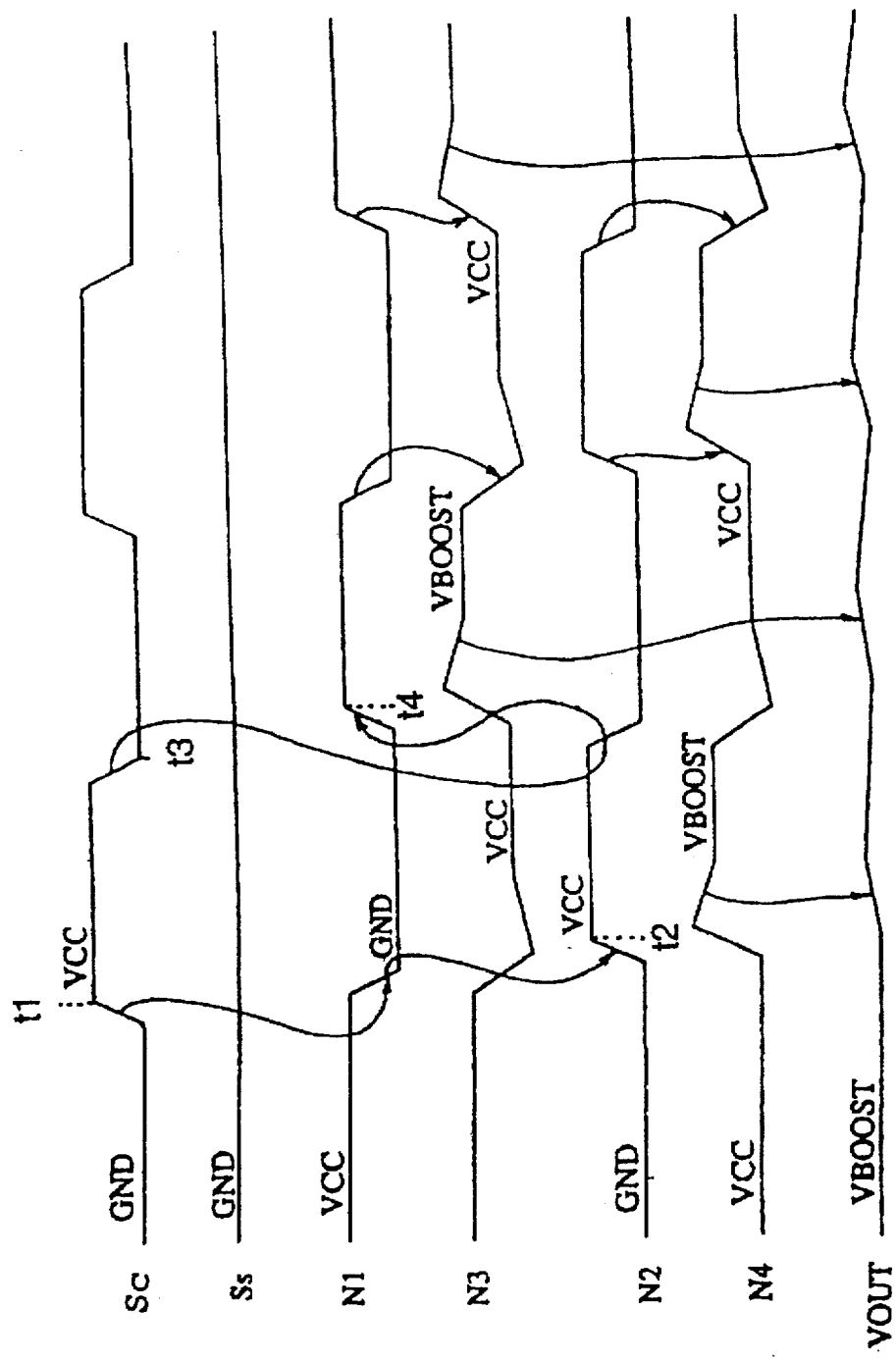
FIG. 2 is a timing chart showing an operation of the booster circuit according to the first embodiment of the invention.
Figure 3:
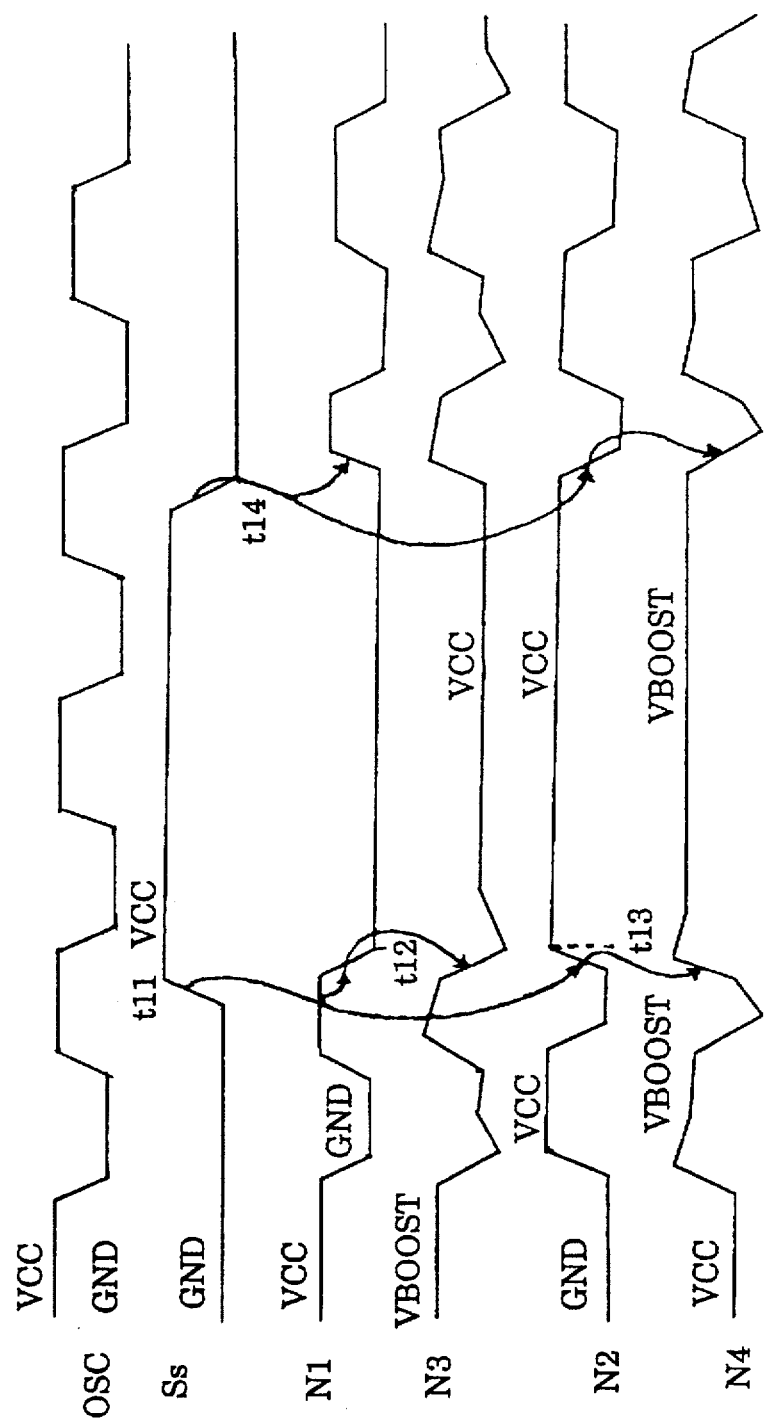
FIG. 3 is another timing chart showing an operation of the booster circuit according to the first embodiment of the invention.

First Embodiment (FIGS. 1 to 3):

FIGS. 1 to 3 show a booster circuit and a method of driving the same according to a first embodiment of the invention. Particularly, FIG. 1 shows a structure of a booster circuit 20 of the first embodiment, FIG. 2 shows waveforms for explaining the boosting operation of the booster circuit 20, and FIG. 3 shows waveforms for explaining the boosting operation of the booster circuit 20 when the booster circuit 20 stops the boosting operation.

The structure of the booster circuit 20 will be now described with reference to FIG. 1(A).

The booster circuit 20 comprises first and second boosting capacitor C1 and C2 respectively composed of N-channel MOS transistors (hereinafter referred to as NMOSs), first to fourth NMOS transistors T1 to T4 serving as first to fourth switching elements, a logic circuit 21, a sensor circuit 13, and a control signal generator circuit 23.

A drain of the transistor T1 and a first electrode (a gate electrode of an NMOS) of the boosting capacitor C1 are respectively connected to a node N3. A drain of the transistor T2 and a first electrode (a gate electrode of the NMOS) of the boosting capacitor C2 are respectively connected to a node N4. A power-supply potential level VCC (e.g., 5V) is applied to a source of the transistor T1 and a source of the transistor T2. A gate of the transistor T1 is connected to the node N4 and a gate of the transistor T2 is connected to the node N3. The transistors T3 and T4 are transistors for supplying a boosting potential level to a boosting voltage output terminal VOUT. Accordingly, the transistor T3 is connected between the boosting voltage output terminal VOUT and the node N3 while the transistor T4 is connected between the boosting voltage output terminal VOUT and the node N4. Further, a gate of the transistor T3 is connected to the node N3 and a gate of the transistor T4 is connected to the node N4. Accordingly, although the transistors T3 and T4 transmit the potential levels of the nodes N3 and N4 to the boosting voltage output terminal VOUT, the potential level of the boosting voltage output terminal VOUT is not transmitted to the nodes N3 and N4.

Figure 8:
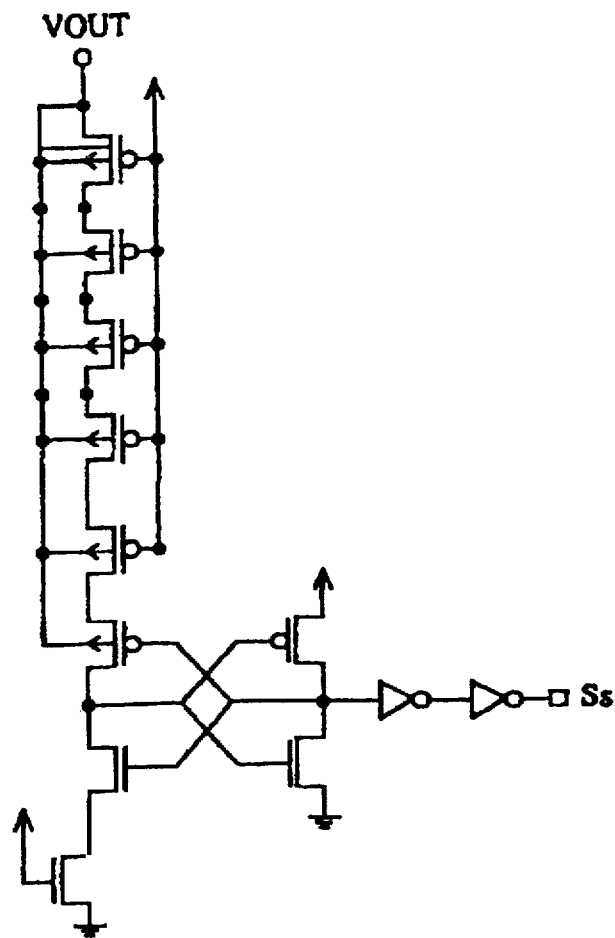
FIG. 8(A) is a view showing an example of a sensor circuit.
FIG. 8(B) is a view showing another example of a sensor circuit.
Figure 8:
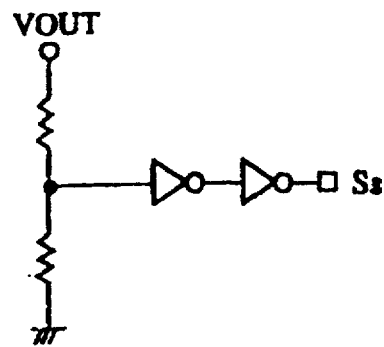

The sensor circuit 13 is composed of a circuit, e.g., as illustrated in FIG. 8(A). The sensor circuit 13 outputs a low level (hereinafter simply referred to as LOW) when the potential level of the boosting voltage output terminal VOUT is lower than a given value, and outputs a high level (hereinafter simply referred to as HIGH) when it is higher than the given value. The sensor circuit 13 in FIG. 8(A) may be composed of a circuit other than that shown in FIG. 8(A), for example, a circuit satisfying a function of an equivalent circuit shown in FIG. 8(B).

The logic circuit 21 includes a first two-input NOR element 21a as a first gate, a second two-input NOR element 21b as a second gate and an inverter 21c as a third gate. An output of the first two-input NOR element 21a is connected to a node N1 which is connected to a second electrode of the boosting capacitor C1, and an output of the second two-input NOR element 21b is connected to a node N2 which is connected to a second electrode of the boosting capacitor C2. Each output of one of the first and second two-input NOR elements 21a and 21b is connected to each first input of the other of the first and second two-input NOR elements 21a and 21b. Accordingly, the first and second two-input NOR elements 21a and 21b respectively constitute flip-flops.

A control signal Sc issued from the control signal generator circuit 23 is supplied to the second input of the first two-input NOR element 21a while the same signal Sc is supplied to the second input of the second two-input NOR element 21b by way of the inverter 21c. When the control signal Sc is HIGH, the output of the first two-input NOR element 21a goes LOW. That is, the logic circuit 21 sets the potential level of the node N1 to a first potential level (low level) when the control signal Sc is HIGH. When the output of the first two-input NOR element 21a goes LOW, the first input of the second two-input NOR element 21b goes LOW. Since the control signal Sc is HIGH, the second input of the second two-input NOR element 21b is LOW. Accordingly, the output of the second two-input NOR element 21b goes HIGH. That is, the logic circuit 21 sets the potential level of the node N2 to a second potential level (high level) when the control signal Sc is HIGH. When the control signal Sc is LOW, the logic circuit 21 permits each potential level of the nodes N1 and N2 to be in the states opposite to the previous states.

Figure 9:
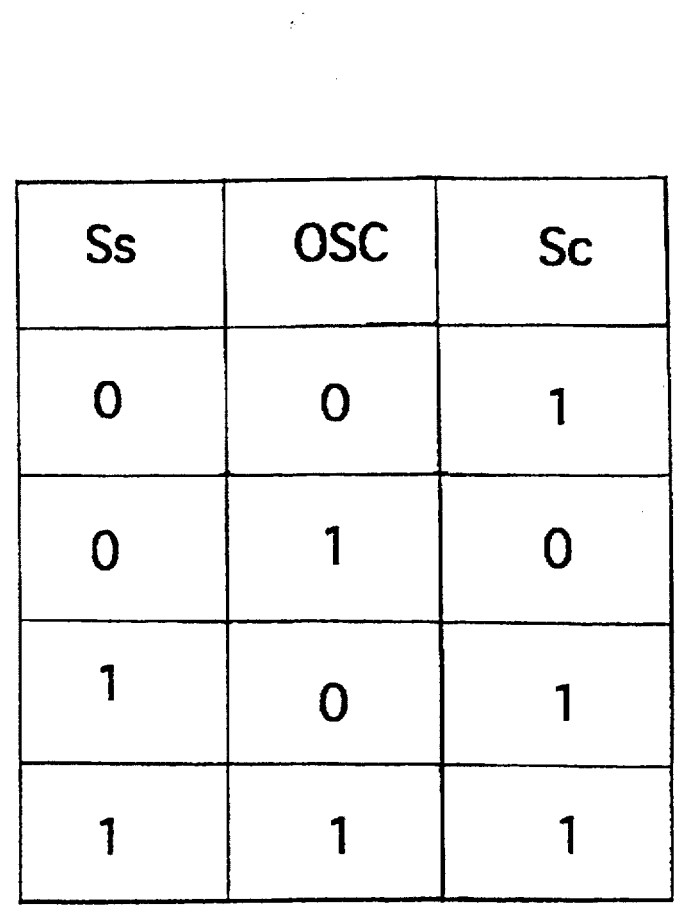

The control signal generator circuit 23 comprises an inverter for receiving a sensor signal Ss, and a two-input NAND element having a first input for receiving an output of the inverter and a second input for receiving an oscillation signal OSC issued from an oscillation circuit. A truth table of the control signal generator circuit 23 is shown in FIG. 9. In the same figure, denoted by "0" means that each potential level of each signal is LOW, while denoted by "1" means that each potential of each signal is HIGH. As illustrated in FIG. 9, the control signal generator circuit 23 outputs the oscillation signal OSC, which is issued from the oscillation circuit and appears alternately as HIGH and LOW, to the logic circuit 21 as the control signal Sc when the sensor signal Ss is LOW. The control signal generator circuit 23 outputs HIGH to the logic circuit 21 as the control signal Sc irrespective of the oscillation signal OSC issued from the oscillation circuit when the sensor signal Ss is HIGH. Accordingly, in the booster circuit 20 in FIG. 1(A), the potential level of the node N2 is fixed to HIGH when the boosting operation stops (when the sensor signal Ss is HIGH). Accordingly, the potential level of the node N4 connected to the second boosting capacitor C2 is kept in a boosted state.

The structure of the control signal generator circuit 23 is not limited to that as illustrated in FIG. 1(A). For, example, the control signal generator circuit 23 may be composed of a two-input NOR element 23 for receiving the oscillation signal OSC issued from the oscillation circuit and the sensor signal Ss as illustrated in FIG. 1(B). A truth table in this case is different from that in FIG. 9. Since the potential level of the node N1 is fixed to HIGH when the boosting operation stops (when the sensor signal Ss is HIGH), the potential level of the initially connected to the first boosting capacitor C1 is kept in a boosted state.

The operation of the booster circuit 20 shown in FIG. 1(A) will be now described.

The boosting operation is first explained with reference to FIG. 2.

Suppose that the potential level of the boosting voltage output terminal VOUT is lower than a given value, and the sensor circuit 13 outputs the sensor signal Ss of low level (ground level). At this time, suppose that the oscillation signal OSC issued from the oscillation circuit is changed from LOW to HIGH (VCC level). (At time t1 of the oscillation signal OSC in FIG. 2), accordingly, the potential level of the node N1 goes LOW, and the potential level of the node N3 falls from the boosted potential level (VBOOST level which is the potential level higher than the power-supply potential level VCC).

Whereupon, when the potential level of the node N1 goes LOW, the potential level of the node N2 goes HIGH. (At time t2) since the potential level of the node N4 has been already precharged to the VCC level by the transistor T2, (since the gate of the transistor T2 is connected to the node N3 which is boosted in one previous cycle, the transistor T2 is sufficiently in an ON state (hereinafter simply referred to as ON). Accordingly, the potential level of the node N4 is surely precharged to the VCC level), the potential level of the node N4 is boosted to a potential level which is sufficiently higher than the power-supply potential level VCC, namely, to the potential level of substantially two times thereof, i.e., 2 VCC. When the potential level of the node N4 is boosted, the transistor T4 is sufficiently ON so that the potential level, which is sufficiently higher than the power-supply potential level VCC, is supplied to the boosting voltage output terminal VOUT. When the potential level of the node N4 is boosted, the transistor T1 is sufficiently ON. Accordingly, the potential level of the node N3 is surely precharged to the power-supply potential level VCC level.

Successively when the oscillation signal OSC is changed from HIGH to LOW (at time t3), the potential level of the node N2 goes LOW. When the potential level of the node N2 goes LOW, the potential level of the node N4 falls. Since the transistor T4 is in an OFF state (hereinafter simply referred to as OFF) when the potential level of the node N4 falls, the node N4 is electrically insulated from the boosting voltage output terminal VOUT. Further, since the transistor T1 is also OFF, the node N3 is electrically insulated from the power-supply potential level VCC. (The precharging operation of the node N3 by the transistor T1 is completed).

On the other hand, when the oscillation signal OSC is changed from HIGH to LOW (at time t3), the potential level of the node N1 goes HIGH. (At time t4) when the potential level of the node N1 goes HIGH, the potential level of the node N3 is boosted. Since the potential level of the node N3 has been already precharged to the VCC level by the transistor T1. (since the gate of the transistor T1 is connected to the node N4 which is boosted in one previous cycle, the transistor T1 is sufficiently ON. Accordingly, the potential level of the node N3 is surely precharged to the VCC level), the potential level of the node N3 is boosted to that which is sufficiently higher than the power-supply potential level VCC, i.e., to substantially 2 VCC level. When the potential level of the node N3 is boosted, the transistor T3 is ON, so that the potential level (VBOOST) which is sufficiently higher than that of the power-supply potential level VCC is supplied to the boosting voltage output terminal VOUT. When the potential level of the node N3 is boosted, the transistor T2 is sufficiently ON. Accordingly, the potential level of the node N4 is surely precharged to the VCC level.

The operation for stopping or resuming the boosting operation in response to the sensor signal Ss will be described next with reference to FIG. 3.

When the potential level of the boosting voltage output terminal VOUT exceeds a given value, the sensor circuit 13 outputs the sensor signal Ss of high level so as to inform the control signal generator circuit 23 that the potential level of the boosting voltage output terminal VOUT is sufficiently high.

When the sensor signal Ss is changed from L as the first signal to H as the second signal (at time t11), the control signal generator circuit 23 outputs the control signal Sc, which is fixed to HIGH, to the logic circuit 21. (See the truth table in FIG. 9) when the control signal Sc goes HIGH, the potential level of the node N1 is fixed to LOW (at time t12), then the potential level of the node N2 is fixed to HIGH slightly later than that of the node N1. (At time 13). When the potential level of the node N1 goes LOW, the potential level node N3 falls. Since the potential level of the node N2 is HIGH and the potential level of the node N4 is precharged in the previous cycle, the potential level of the node N4 is boosted to the VBOOST level. Since the potential level of the node N4 is sufficiently higher than the power-supply potential level VCC, the transistor T1 is sufficiently ON. Accordingly, the potential level of the node N3 is precharged to the VCC level which is held.

The feature of the present invention resides in that the potential level of the node N2 (node N1) is held HIGH when the sensor signal Ss goes HIGH, namely, when the boosting operation stops, so that the potential level of the node N4 (node N3) is held the boosting level (VBOOST). When the potential level of the node N4 (node N3) is held the VBOOST level, the transistor T1 (transistor T2) having the gate to which the VBOOST level is to be supplied is sufficiently ON, and the potential level of the node N3 (node N4) to be precharged is held the VCC level. As a result, the potential level of the node N3 (node N4), which has been precharged when the boosting operation is resumed, is boosted to a sufficient boosting level (VBOOST level). If the precharged level is lower than the VCC level, the boosting level is inevitably lowers.

Then, when the potential level of the boosting voltage output terminal VOUT is lower than a given value, the sensor circuit 13 outputs the sensor signal Ss of low level so as to inform the control signal generator circuit 23 that the potential level of the boosting voltage output terminal VOUT lowers. (At time t14) when the potential level of the sensor signal Ss is changed to LOW, the oscillation signal OSC is outputted to the logic circuit 21 as the control signal as shown in FIG. 9. Accordingly, the potential levels of the nodes N1 and N2 are alternately changed to LOW and HIGH in response to the potential level of the oscillation signal OSC.

As mentioned above, according to the present invention, since one of the potential levels of the boosting nodes (nodes N3 and N4) is always in a boosted state when the boosting operation is stopped in response to the sensor signal, the other of the potential levels of the boosting nodes can be sufficiently precharged. As a result, it is possible to provide a booster circuit capable of always supplying a stable boosting level.

Second Embodiment (FIGS. 4 and 5):

A booster circuit and a method of driving the same according to a second embodiment of the invention will be described hereinafter with reference to FIGS. 4 and 5.

Figure 4:
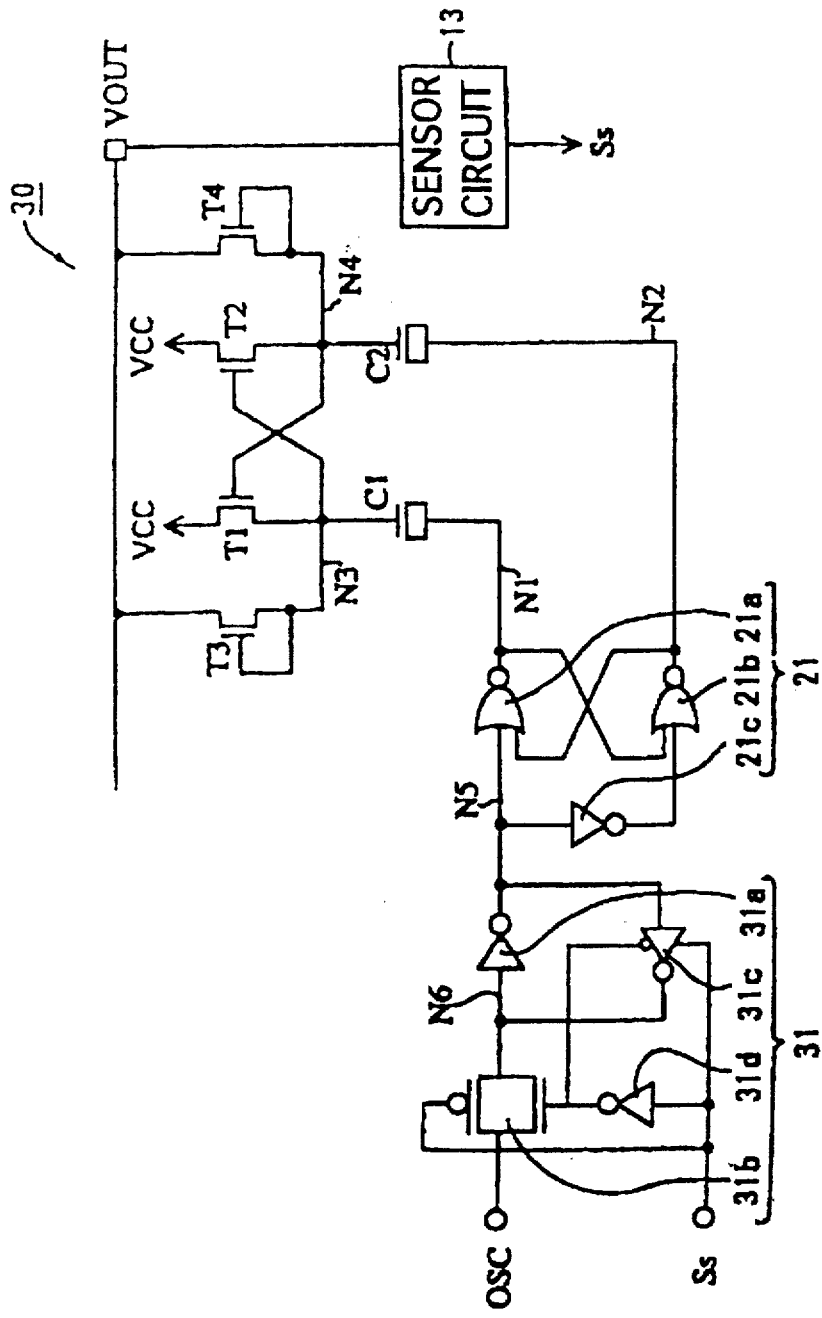
FIG. 4 is a view of a booster circuit according to a second embodiment of the invention.
Figure 5:
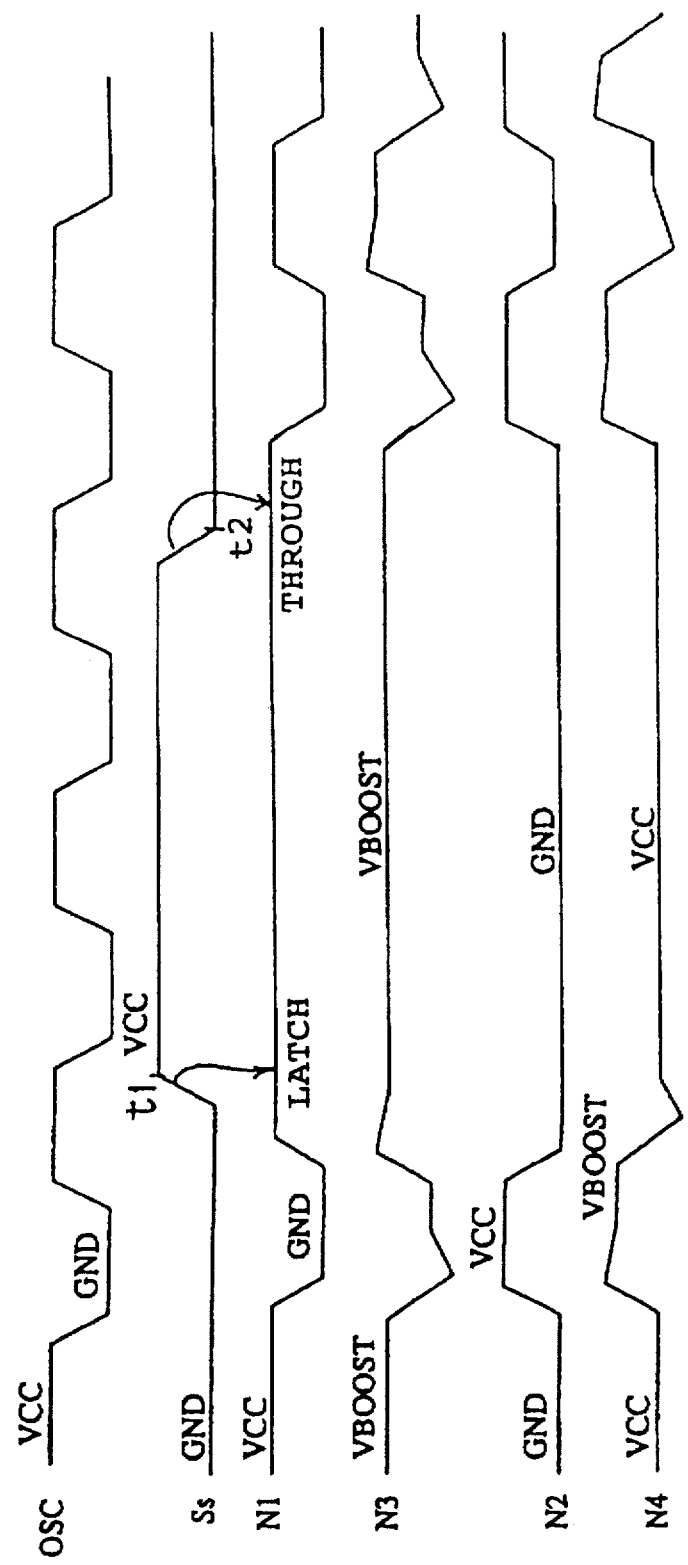
FIG. 5 is a timing chart showing an operation of the booster circuit according to the second embodiment of the invention.

FIG. 4 shows a structure of a booster circuit 30 according to the second embodiment of the invention, and FIG. 5 shows waveforms for principally explaining the operation when the booster circuit 30 stops its boosting operation.

The difference between the booster circuit 20 and the booster circuit 30 occurs based on the existence of a control signal generator circuit 31. The control signal generator circuit 31 includes a latch circuit which outputs the oscillation signal OSC to the logic circuit 21 when the sensor signal Ss is a first signal (low level), or latches the state of the oscillation signal OSC and outputs the latched oscillation signal OSC to the logic circuit 21 when the sensor signal Ss is a second signal (high level).

Concretely, the control signal generator circuit 31 comprises a inverter 31a, a transfer gate 31b, a clocked inverter 31c, and an inverter 31d. An output of the inverter 31a is connected to one input of the first two-input NOR element 21a of the logic circuit 21 and a node N5 which is connected to the input of the inverter 21c. An input of the first inverter 31a is connected to a node N6 which is connected to an output of the transfer gate 31b. The oscillation signal OSC is supplied to an input of the transfer gate 31b. The sensor signal Ss is supplied to a gate of the PMOS transistor of the transfer gate 31b, while an output of the second inverter 31d is connected to the gate of the NMOS transistor. The sensor signal Ss is also supplied to an input of the inverter 31d. The output of the clocked inverter 31c is connected to the node N6 and the input thereof is connected to the node N5. The gate of the PMOS transistor of the clocked inverter 31c is connected to an output of the inverter 31d, and the sensor signal Ss is supplied to the gate of the NMOS transistor.

The operation of the booster circuit 30 will be now described. Since the boosting operation of the booster circuit 30 is the same as that of the booster circuit 20, it is omitted, but the operation for stopping and resuming the boosting operation will be now described with reference to FIG. 5.

When the sensor signal Ss is changed from LOW to HIGH (at time t1), the transfer gate 31b is OFF and the clocked inverter 31c is ON. Accordingly, the control signal generator circuit 31 latches the present potential level of the oscillation signal OSC. As a result, even if the potential level of the oscillation signal OSC is changed thereafter, the potential level of each node of the booster circuit 30 is held the present one. For example, if the oscillation signal OSC of high level is latched, the potential level of the node N1 is fixed to LOW and the potential level of the node N2 is fixed to LOW.

According to the present invention, when the boosting operation stops, it is possible to hold the state immediately before the boosting operation stops. Accordingly, according to the present invention, the booster circuit is neither reset nor stopped during boosting or precharging operation owing to some trouble.

Then, when the potential level of the sensor signal Ss is changed from HIGH to LOW (at time t2), the transfer gate 31b is ON and the clocked inverter 31c is OFF, thereby releasing the latching operation. Accordingly, the control signal generator circuit 31 outputs the potential level corresponding to that of the oscillation signal OSC to the logic circuit 21 so that the booster circuit 30 performs the boosting operation again.

According to the present invention, since the oscillation signal OSC is latched when the boosting operation is stopped using the sensor signal Ss, it is possible to prevent the precharged level of the boosting node (nodes N3 and N4) from lowering, which occurs when the booster circuit is reset.

Third Embodiment (FIGS. 6 and 7):

It cannot be denied that the potential levels of the boosting nodes (nodes N3 and N4) lower when the boosting operation stops for a long period of time. Particularly, when the potential level of either of the boosting nodes (nodes N3 and N4), which is subject to the precharging operation, lowers, the potential level thereof inevitably lowers when the boosting operation is resumed so that the potential level, which is sufficiently higher than the power-supply potential level, is difficult to be supplied to the boosting voltage output terminal VOUT. Further, a possibility that the precharging operation per se is not normally performed cannot be denied.

Figure 6:
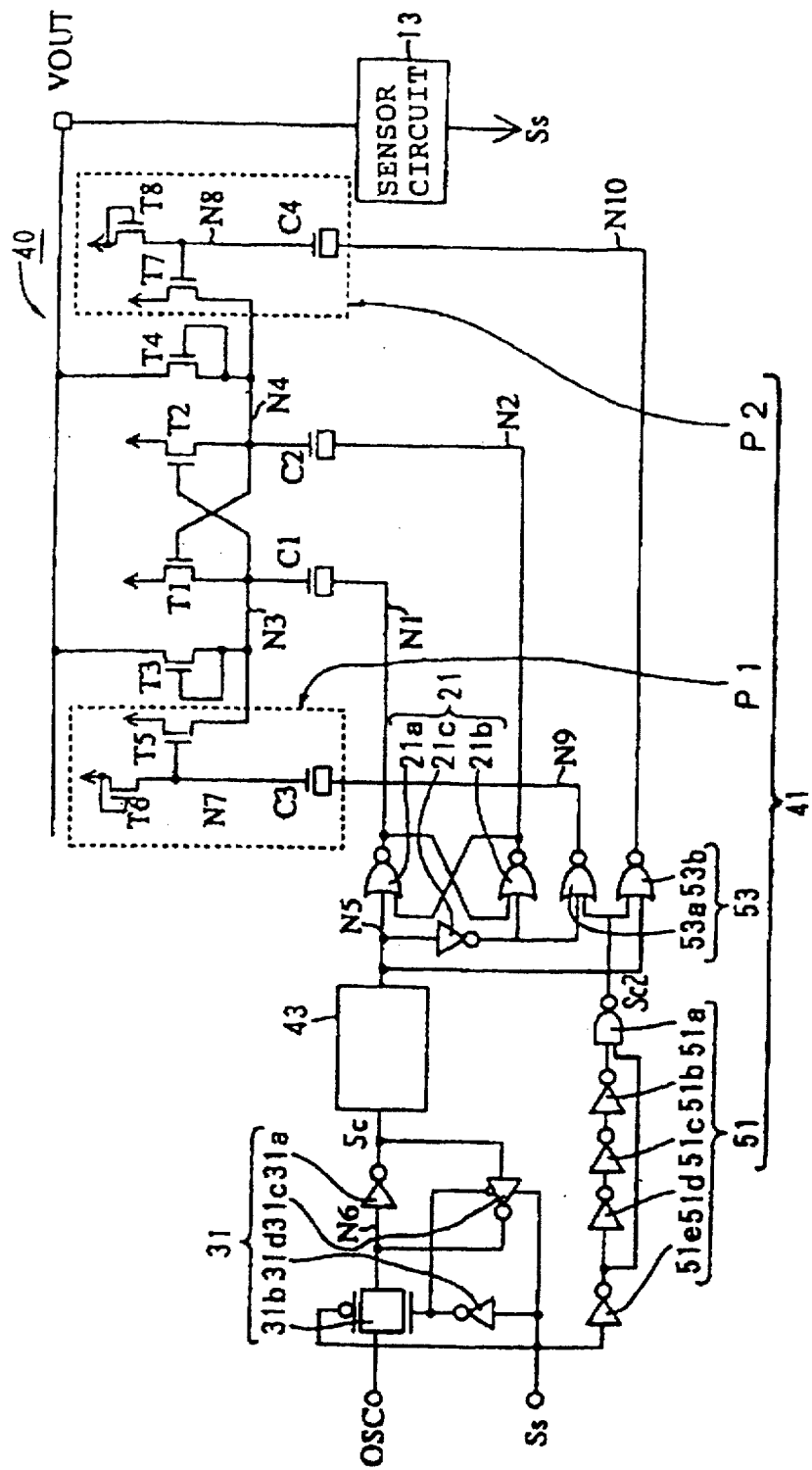
FIG. 6 is a view of a booster circuit according to a third embodiment of the invention.

The third embodiment provides a booster circuit solved this problem. FIG. 6 shows a booster circuit 40 of the third embodiment. The booster circuit 40 includes a precharge compensation circuit 41 and a delay circuit 43 in addition to the boosting circuit 30 in FIG. 4. Described mainly hereinafter are the precharge compensation circuit 41 and the delay circuit 43.

The precharge compensation circuit 41 comprises NMOS transistors T5 to T8 as fifth to eighth switching elements, MOS capacitors C3 and C4 serving as third and fourth boosting capacitors, a second control signal generator circuit 51 and a second logic circuit 53.

The transistor T5 includes a drain connected to the node N3, a source connected to the precharge power-supply VCC, and a gate connected to a first electrode of the boosting capacitor C3. The transistor T7 comprises a drain connected to the node N4, a source connected to the precharge power-supply VCC and a gate connected to a first electrode of the boosting capacitor C4. The transistor T6 is a transistor for preventing the potential level of a node N7 from lowering lower than that of (VCC−VT), and it is connected between the power-supply VCC and the node N7 as a diode. The transistor T8 is a transistor for preventing the potential level of a node N8 from lowering lower than that of (VCC−VT), and it is connected between the power-supply VCC and the node N8 as a diode.

The second control signal generator circuit 51 produces a second control signal Sc2 having a given time width in response to the change of the sensor signal Ss from the second signal (high level) to the first signal (low level). That is, the second control signal generator circuit 51 produces one shot pulse in response to the change of the sensor signal Ss from the second signal (high level) to the first signal (low level). More in detail, the second control signal generator circuit 51 comprises a NAND element 51a, and first to fourth inverters 51b to 51e. The first to fourth inverters 51b to 51e are serially connected to one another. The NAND element 51a receives an output of the first inverter 51b and an output of the fourth inverter 51e, thereby outputting the second control signal Sc2.

The second logic circuit 53 comprises a two-input NOR element 53a having an output connected to a node N9 which is connected to a second electrode of the boosting capacitor C3, a first input for receiving the output of the inverter 21c, and a second input for receiving the second control signal Sc2, and a two-input NOR element 53b having an output connected to a node N10 which is connected to a second electrode of the boosting capacitor C4, a first input for receiving the output of the inverter 21c, and a second input for receiving the second control signal Sc2.

The delay circuit 43 is connected between the control signal generator circuit 31 and the logic circuit 21 for delaying the control signal Sc which is outputted from the control signal generator circuit 31 by a given time. The delay time is set considering a time involved in precharging by the precharge compensation circuit 41. Although a concrete structure of the delay circuit 43 is not illustrated, the delay circuit 43 may have any structure if it realizes a delay operation.

Figure 7:
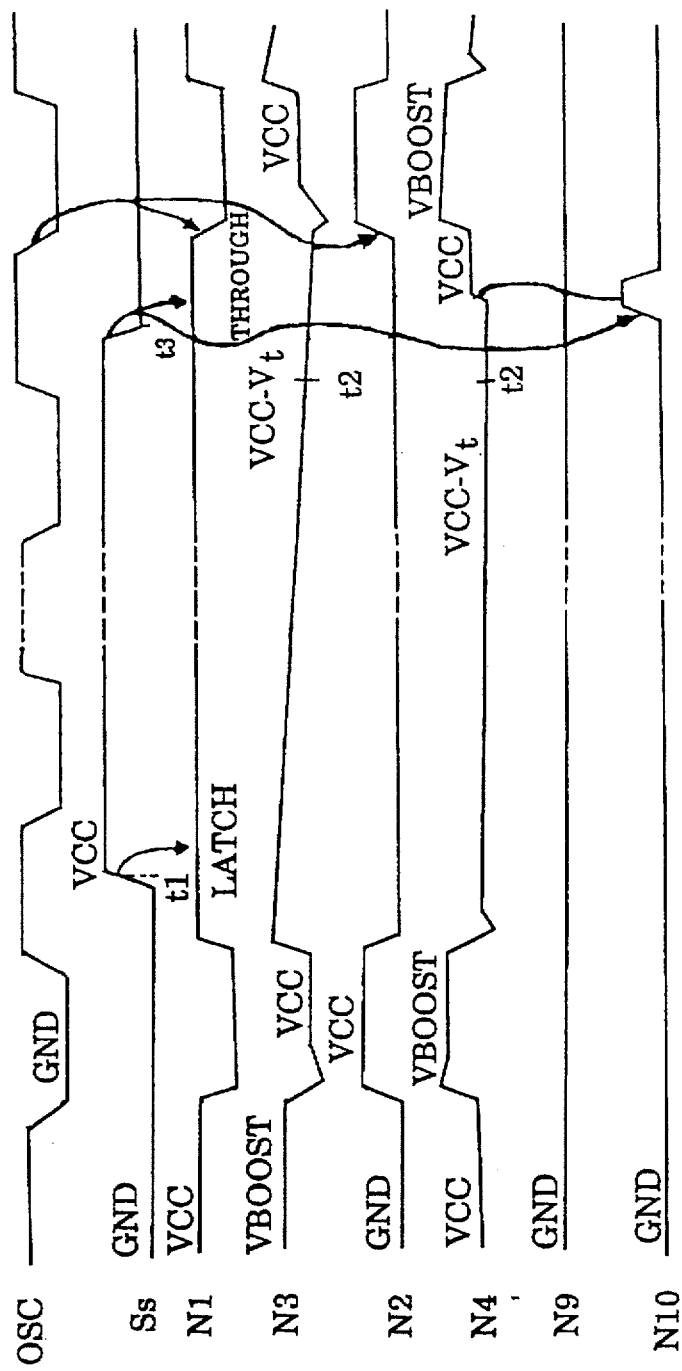
FIG. 7 is a timing chart showing an operation of the booster circuit according to the third embodiment of the invention.

The operation of the booster circuit 40 will be now described with reference to FIGS. 6 and 7. Since the boosting operation is the same as that of the booster circuits 20 and 30 in the first and second embodiments, it is omitted, but the operation for stopping and resuming the boosting operation will be now described.

When the sensor signal Ss is changed from LOW to HIGH ( at time t1), the transfer gate 31b is OFF and the clocked inverter 31c is ON, so that the potential level of the oscillation signal OSC is latched. Accordingly, even if the oscillation signal OSC is changed thereafter, the potential levels of each node of the booster circuit is held the present one. Supposing that the potential level of the node N3 is boosted (boosted to the VBOOST level) at time t1, the transistor t2 is ON so that the potential level of the node N4 is precharged to the VCC level by way of the transistor T2. However, if this state continues for a long period of time, the potential level of the node N3 lowers (at time t2), and finally it lowers to the level lower than the VCC level so that the potential level of the node N4 lowers to the level of (VCC−Vt). (At time t2) when the sensor signal Ss is changed from HIGH to LOW (at time t3), and the boosting operation is resumed, it is impossible to obtain the sufficient boosting level since the potential level of the node N4 is not sufficiently precharged to the VCC level.

Under the circumstances, the precharge compensation circuit 41 and the delay circuit 43 are provided according to the third embodiment. The operation of the third embodiment will be now described as follows.

Suppose that the potential levels of the nodes N3 and N4 fall to the level of (VCC−Vt) during the stopping period of the boosting operation. If the sensor signal Ss is changed from HIGH to LOW in this state, the second control signal generator circuit 51 outputs the one-shot pulse. The two-input NOR element 53b outputs the one-shot pulse to a node N10 necessary for precharging in response to the one-shot pulse and the potential level of the node N5. (AT time t3) as a result, the potential level of the node N8 is boosted by the boosting capacitor C4. The transistor T7 is sufficiently ON upon reception of the potential level of the boosted node N8, thereby precharging the potential level of the node N4 to the VCC level. Thereafter, the control signal Sc which is delayed by the delay circuit 43 is supplied to the logic circuit 21 so that the boosting operation of the node N4 is performed in the same manner as the first and second embodiments. Since the potential level of the node N4 is sufficiently precharged to the VCC level in this boosting operation, the boosting level which is sufficiently higher than the VCC level can be obtained as the potential level of the node N4.

Successively, the boosting operation is repeated by the control signal Sc (oscillation signal OSC).

As mentioned above, according to the third embodiment, the boosting operation can be resumed in favorable condition even if the boosting operation is stopped for a long period of time so that the precharging level lowers since the given precharging operation can be performed when the boosting operation is resumed.

What is claimed is:

1. A booster circuit comprising:

a first capacitor having first and second electrodes;

a second capacitor having first and second electrodes;

a switching circuit for transferring boosted potential appearing on each first electrode of the first and second capacitors to a boosting potential output node;

a precharge circuit for precharging each first electrode of the first and second capacitors;

a logic circuit for setting a potential level of the second electrode of the first capacitor to a first potential level and setting a potential level of the second electrode of the second capacitor to a second potential level which is higher than the first potential level, respectively upon reception of a control signal having a first state, and for setting the potential level of the second electrode of the first capacitor to the second potential level, and setting the potential level of the second electrode of the second capacitor to the first potential level, respectively upon reception of a control signal having a second state;

a detector circuit for outputting a detecting signal having a first state when a potential level of the boosting potential output node is lower than a given value, and outputting a detecting signal having a second state when the potential level of the boosting potential output node is higher than the given level; and a control signal generator circuit for alternately outputting the control signals having the first and second states in response to an oscillation signal upon reception of the detecting signal having the first state, and for outputting either of the control signal having the first state or the control signal having the second state irrespective of the oscillation signal upon reception of the detecting signal having the second state.

2. A booster circuit according to claim 1, wherein the precharge circuit comprises first and second switching elements, wherein the first switching element is controlled by the potential level of the first electrode of the first capacitor for supplying a precharge potential to the first electrode of the second capacitor, and the second switching element is controlled by the potential level of the first electrode of the second capacitor for supplying a precharge potential to the first electrode of the first capacitor.

3. A booster circuit according to claim 1, wherein the switching circuit comprises third and fourth switching elements, and wherein the third switching element is controlled by the potential level of the first electrode of the first capacitor for electrically connecting the first electrode and the boosting potential output node, and the fourth switching element is controlled by the potential level of the first electrode of the second capacitor for electrically connecting the first electrode and the boosting potential output node.

4. A booster circuit according to claim 1, wherein the control signal generator circuit comprises an inverter to which the detecting signal is inputted and a two-input NAND circuit for outputting the control signal upon reception of an output of the inverter and the oscillation signal.

5. A booster circuit according to claim 1, wherein the control signal generator circuit comprises a two-input NOR circuit for outputting the control signal upon reception of the detecting signal and the oscillation signal.

6. A booster circuit according to claim 1, wherein the control signal generator circuit includes a latch circuit for latching a state of the control signal upon reception of the detecting signal having the second state.

7. A booster circuit comprising:

a first capacitor having first and second electrodes;

a second capacitor having first and second electrodes;

a switching circuit for transferring boosted potential appearing on each first electrode of the first and second capacitors to a boosting potential output node;

a first logic circuit for setting a potential level of the second electrode of the first capacitor to a first potential level and setting a potential level of the second electrode of the second capacitor to a second potential level which is higher than the first potential level, respectively upon reception of a first control signal having a first state, and for setting the potential level of the second electrode of the first capacitor to the second potential level, and setting the potential level of the second electrode of the second capacitor to the first potential level, respectively upon reception of a control signal having a second state;

a detector circuit for outputting a detecting signal having a first state when a potential level of the boosting potential output node is lower than a given value, and outputting a detecting signal having a second state when the potential level of the boosting potential output node is higher than the given level;

a first control signal generator circuit for alternately outputting the first control signals having the first and second states in response to an oscillation signal upon reception of the detecting signal having the first state, and for outputting either of the first control signal having the first state or the first control signal having the second state irrespective of the oscillation signal upon reception of the detecting signal having the second state; and a precharge circuit for precharging the second electrode of the first capacitor or the second electrode of the second capacitor, the first and second capacitors each having the first electrode to which the first potential level is supplied in response to a change of the detecting signal from the second state to the first state.

8. A booster circuit according to claim 7, further comprising:

a delay circuit connected between the first control signal generator circuit and the first logic circuit for delaying the first control signal by a given time;

wherein the precharge circuit includes:

a second control signal generator circuit for outputting a second control signal having a given time width in response to a change of the detecting signal from the second state to the first state;

a second logic circuit for outputting a one shot pulse in response to the delayed first control signal and the second control signal; and a precharge compensation part for precharging the second electrode of the first capacitor or the second electrode of the second capacitor, the first and second capacitors each having the first electrode to which the first potential level is supplied in response to the one shot pulse.

9. A booster circuit according to claim 7, wherein the switching circuit comprises third and fourth switching elements, and wherein the third switching element is controlled by the potential level of the first electrode of the first capacitor for electrically connecting the first electrode and the boosting potential output node, and the fourth switching element is controlled by the potential level of the first electrode of the second capacitor for electrically connecting the first electrode and the boosting potential output node.

10. A booster circuit according to claim 7, wherein the first control signal generator circuit comprises an inverter to which the detecting signal is inputted and a two-input NAND circuit for outputting the first control signal upon reception of an output of the inverter and the oscillation signal.

11. A booster circuit according to claim 7, wherein the first control signal generator circuit comprises a two-input NOR circuit for outputting the first control signal upon reception of the detecting signal and the oscillation signal.

12. A booster circuit according to claim 7, wherein the first control signal generator circuit comprises a latch circuit for latching a state of the first control signal upon reception of the detecting signal having the second state.

13. A method of driving a booster circuit including first and second boosting capacitors respectively having first and second electrodes, the method comprising steps of:

(a) setting a potential level of the first electrode of the first boosting capacitor to a first potential level, and at the same time setting a potential level of the first electrode of the second boosting capacitor to a second potential level which is higher than the first potential level, thereby setting a potential level of the second electrode of the second boosting capacitor to a third potential level which is higher than the second potential level;

(b) setting the potential level of the first electrode of the first boosting capacitor to the second potential level, and at the same time setting the potential level of the first electrode of the second boosting capacitor to the first potential level, thereby setting a potential level of the second electrode of the first boosting capacitor to the third potential level;

(c) alternately repeating steps of (a) and (b); and (d) stopping an operation of the booster circuit in a state that a potential level of either of the first electrode of the first boosting capacitor or the first electrode of the second boosting capacitor is fixed to the second potential level.

* * * * *

UNITED STATES PATENT AND TRADEMARK OFFICE
CERTIFICATE OF CORRECTION

PATENT NO. : 5,781,426
DATED : July 14, 1998
INVENTOR(S) : Yuichi MATSUSHITA

It is certified that error appears in the above-indentified patent and that said Letters Patent is hereby corrected as shown below:

In the Abstract, line 1, delete "typical"; change "of the present invention comprises" to --includes--;

line 6, change "," to --. The booster circuit also includes--;

line 7, change ", a" to --. A--;

line 8, after "circuit" insert --is also included--;

line 9, after "and" insert --for--;

line 13, change ", and" to --. The logic circuit is also--;

line 15, after "and" insert --for--;

line 18, change "," to --. The booster circuit also has--;

line 21, after "and" insert --for--;

UNITED STATES PATENT AND TRADEMARK OFFICE
CERTIFICATE OF CORRECTION

PATENT NO. : 5,781,426
DATED : July 14, 1998
INVENTOR(S) : Yuichi MATSUSHITA

It is certified that error appears in the above-indentified patent and that said Letters Patent is hereby corrected as shown below:

In the Abstract, line 23, change "," to --.--; delete "and a control signal generator--;

lines 20-25, delete entire lines.

In Column 1, line 31, after "," insert --and--;

line 34, change ", a" to --. A--; after "circuit" insert --is included--;

line 36, change "," to --. The booster circuit also includes--;

line 38, after "and" insert --for--;

line 40, after "respectively" insert --,--;

line 41, change ", and" to --. The logic circuit is also--;

line 43, after "and" insert --for--;

UNITED STATES PATENT AND TRADEMARK OFFICE
CERTIFICATE OF CORRECTION

PATENT NO. : 5,781,426
DATED : July 14, 1998
INVENTOR(S) : Yuichi MATSUSHITA

It is certified that error appears in the above-indentified patent and that said Letters Patent is hereby corrected as shown below:

In Column 1, line 45, after "respectively" insert --,--;

line 46, change "," to --. The booster circuit also has--;

line 49, after "and" insert --for--;

line 51, change ", and" to --. Also included in the booster circuit is--.

In Column 2, line 27, delete "of" (second occurrence).

In Column 3, line 57, after "the" (second occurrence) insert --inverse of--.

UNITED STATES PATENT AND TRADEMARK OFFICE
CERTIFICATE OF CORRECTION

PATENT NO. : 5,781,426
DATED : July 14, 1998
INVENTOR(S) : Yuichi MATSUSHITA

It is certified that error appears in the above-indentified patent and that said Letters Patent is hereby corrected as shown below:

In Column 4,   line 13, delete "of the";

line 25, change "oscillation" to --control--; change "OSC" to --Sc--;

line 50, change "oscillation" to --control--; change "OSC" to --Sc--;

line 61, change "oscillation" to --control--; change "OSC" to --Sc--.

In Column 5,   line 42, delete "(node N1)";

line 45, delete "(node N3)";

line 46, delete "(node N3)";

line 47, delete "(transistor T2)";

line 49, delete "(node";

line 50, delete "N4)";

line 51, delete "(node N4)";

UNITED STATES PATENT AND TRADEMARK OFFICE
CERTIFICATE OF CORRECTION

PATENT NO. : 5,781,426
DATED : July 14, 1998
INVENTOR(S) : Yuichi MATSUSHITA

It is certified that error appears in the above-indentified patent and that said Letters Patent is hereby corrected as shown below:

In Column 5,    line 62, after "the" insert --inverse of--.

In Column 6,    line 55, after "held" insert --to--;
                line 58, change "LOW" TO --HIGH--.

In Column 7,    line 25, after "circuit" insert --which--; change "solved" to --solves--.

In Column 8,    line 7, change "output of the inverter 21c" to --delay circuit 43--.

Signed and Sealed this

Twenty-second Day of December, 1998

Attest:

BRUCE LEHMAN

Attesting Officer           Commissioner of Patents and Trademarks